March 17, 1936.　　C. E. HATHORN　　2,034,095
HAND GRIP AND COVER
Filed March 17, 1934　　4 Sheets-Sheet 1
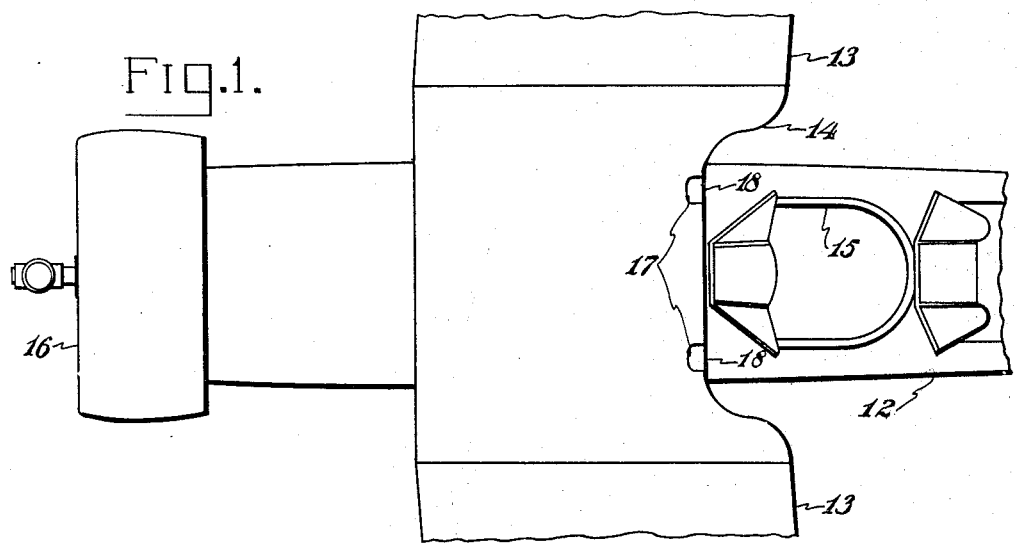
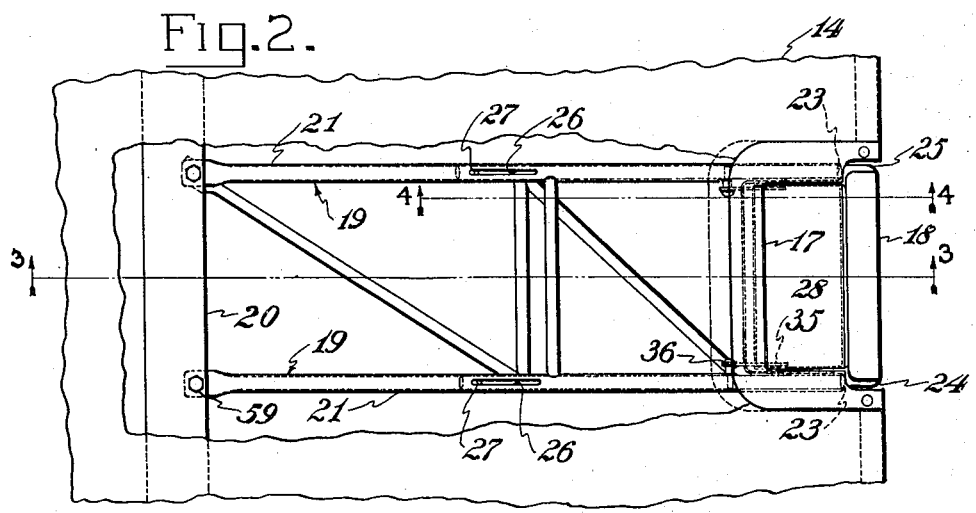
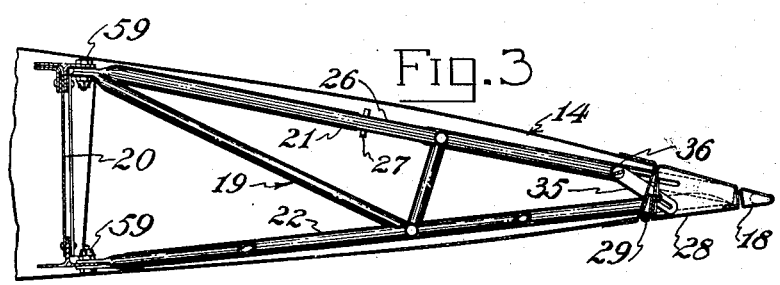
INVENTOR.
CHARLES E. HATHORN.
BY
ATTORNEYS.

March 17, 1936.  C. E. HATHORN  2,034,095
HAND GRIP AND COVER
Filed March 17, 1934  4 Sheets-Sheet 2

INVENTOR.
CHARLES E. HATHORN.
BY
ATTORNEYS.

March 17, 1936.  C. E. HATHORN  2,034,095
HAND GRIP AND COVER
Filed March 17, 1934   4 Sheets-Sheet 3

INVENTOR.
CHARLES E. HATHORN.
BY
ATTORNEYS.

March 17, 1936.  C. E. HATHORN  2,034,095
HAND GRIP AND COVER
Filed March 17, 1934  4 Sheets-Sheet 4

INVENTOR.
CHARLES E. HATHORN
BY
ATTORNEYS.

Patented Mar. 17, 1936

2,034,095

UNITED STATES PATENT OFFICE 2,034,095

HAND GRIP AND COVER

Charles E. Hathorn, Kenmore, N. Y., assignor to Curtiss Aeroplane & Motor Company, Inc., a corporation of New York Application March 17, 1934, Serial No. 716,015

7 Claims. (Cl. 244—31)

This invention relates to aircraft, and is particularly concerned with improvements in hand grips on the wings thereof.

In modern aircraft, it is customary to provide hand grips on the edges of the wings, whereby members of the ground crew can grasp the wings for holding the airplane down or for moving it on the ground, and it is also customary to provide hand grips adjacent the trailing edge of the upper wing center section, providing assist grips to enable the pilot or other member of the aircraft crew to more easily enter and leave the airplane cockpit. In modern types of high speed aircraft, it is desirable to provide continuous streamline surfaces wherever possible. It is therefore an object of this invention to provide streamlined closures for the openings adjacent hand grips as above mentioned, whereby there is a minimum of drag offered by these grips.

A further object is to provide grip closures which normally occupy a position substantially continuous with the airfoil surface so that a minimum of drag is induced.

Still another object is to provide resilient means for normally holding these closures in their closed position, the closures being readily displaced by finger pressure to enable a person to grasp the grip.

Still another object of the invention is to provide such a spring pressed closure which will not tend to bind the hand of a person when inserted in the grip. Often, the pilot is heavily clothed and wears heavy mittens. Thus, it is essential that the grip and closure be so organized that the grip and its closure will not tend to bind the hand or the mitten, so that the mitten may be readily extracted from the grip. In actual embodiments of my invention, three preferred organizations may be arranged, to suit different conditions. Generally speaking, however, they accomplish the same general purpose, namely, providing a sturdy hand grip adjacent the trailing edge of the wing, and providing a closure for the opening forward of said grip which is resiliently urged to a position wherein it is continuous with the airfoil surface.

For a clearer understanding of the invention, reference may be made to the attached drawings, in which similar numbers indicate similar parts, and in which:

Fig. 1 is a plan of a portion of an airplane showing diagrammatically the preferred locations of the hand grips of this invention;

Fig. 2 is a plan, partly broken away, of an airplane wing, showing one embodiment of the hand grip and closure;

Fig. 3 is a section on the line 3—3 of Fig. 2, showing the closure in its normal position;

Figure 4:
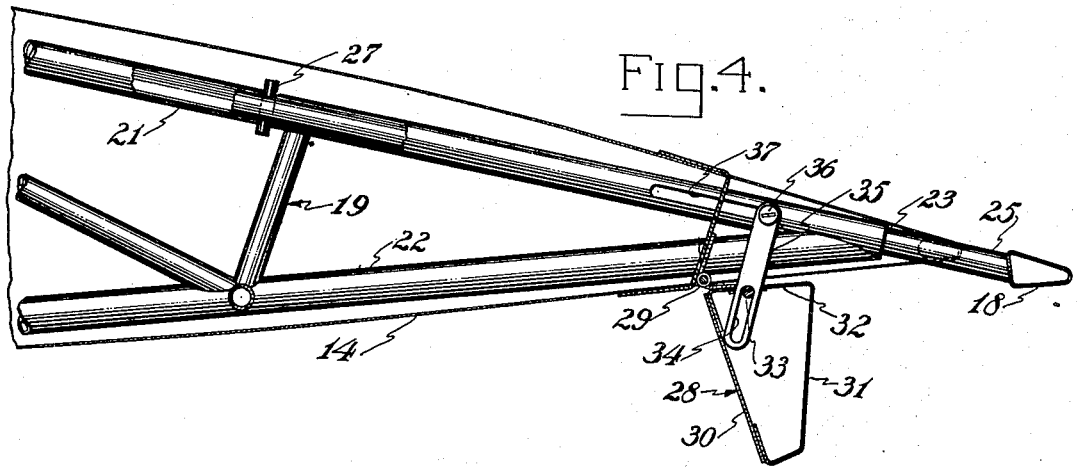
Fig. 4 is an enlarged section on the line 4—4 of Fig. 2, showing the grip and closure in a position to be grasped by a person.

Referring to Fig. 1, 12 is an aircraft fuselage having an upper wing 13 and a center section 14 therefor passing over the fuselage 12, immediately behind the center section 14, and formed in the fuselage is a pilot's cockpit 15. At the forward end of the fuselage, the usual engine and propeller unit 16 is mounted. Adjacent the trailing edge of the center section 14, a pair of cutouts 17 are located, these being provided with hand grips 18 as a continuation of the trailing edge of the center section. These grips 18 are in a position convenient to an occupant of the cockpit 15, whereby such occupant may use the grips to aid him in entering and leaving the cockpit.

Referring to Figs. 2, 3, 4 and 5, the mechanism shown therein depicts one embodiment of a hand grip organization generally denoted as 18. Therein, the cutout 17 is cut forwardly from the trailing edge of the center section 14 through both the top and bottom surfaces of the airfoil. To carry the hand grip 18, a pair of spaced triangulated trusses 19 are attached at their forward ends to the rear center spar 20, the upper and lower members 21 and 22, respectively, of the trusses 19 being preferably formed of tubular material. The rearward end of the upper tube 21 of each truss 19 is open, as at 23, and slidable therein are a pair of tubes 24 and 25 rigidly joined at their rearward ends by the grip 18. Each tube 21 is slotted at 26, and the tubes 24 and 25 carry pins 27 which extend through the slots. Thus, by the limited length of the slots 26, the grip 18 may be moved between a position wherein it is substantially aligned with the trailing edge of the center section, and a position such as that shown in Fig. 4, where it is a short distance rearward of the trailing edge of the center section.

Figure 5:
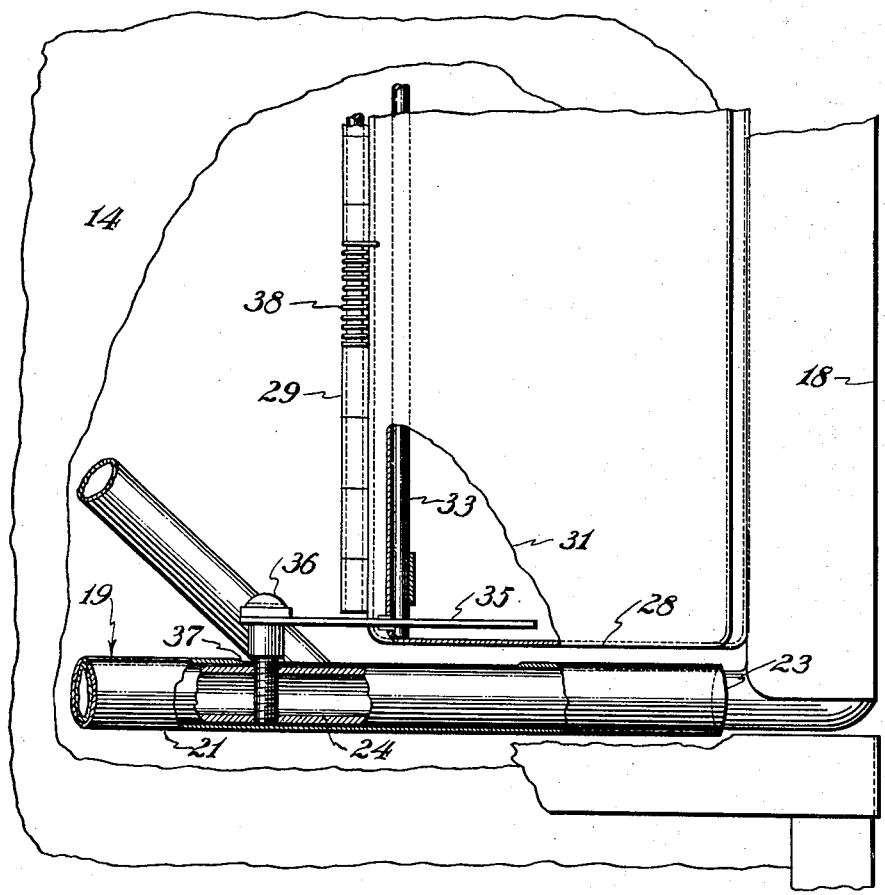
Fig. 5 is an enlarged fragmentary plan, partly in section, of the hand grip of Figs. 2, 3 and 4.

A closure element 28 is hinged at its lower forward corner as at 29 to the rearward lower corner of the cutout 17, the element 28 having a lower surface 30 and an upper surface 31 which, respectively, lie flush with the lower and upper surfaces of the center section 14 when said element 28 is in its normal position as shown best in Fig. 3. The forward surface 32 of the element 28 carries a cross pin 33 which engages within slots 34 formed in the ends of links 35, these links being pivoted at their upper ends as at 36 to the tubes 24 and 25. The tubes 21 are slotted at 37, so that the pivots 36 may oscillate with the handle 18. As shown in Fig. 5, the hinge 29 includes a spring 38 which normally tends to urge the element 28 to the position shown in Fig. 3. In conjunction with the structure above described, the operation of the device will be apparent from the following—the pilot, reaching for the grip 18, rests his fingers against the closure element 28, which is thus turned around its hinge. Upon turning of the element around its hinge, the link 35, by its connection with the element 28, extends the grip 18 rearwardly, which is then grasped by the pilot. The full open position, shown in Fig. 4, indicates that when grasping the grip 18, there is adequate opening forward thereof, due to the fact that the closure element 28 has been depressed. Upon releasing the grip 18, the hinge 38 on the spring 29 urges the element 28 upwardly to its closed position and simultaneously, by the link 35, the grip 18 with its tubes 24 and 25 are urged forwardly so that, when the element 28 is in its flush position, the grip 18 lies immediately adjacent the rearward edge thereof, whereby the element 28 and the grip 18 form a continuation of the upper and lower surfaces of the center section.

Figure 6:
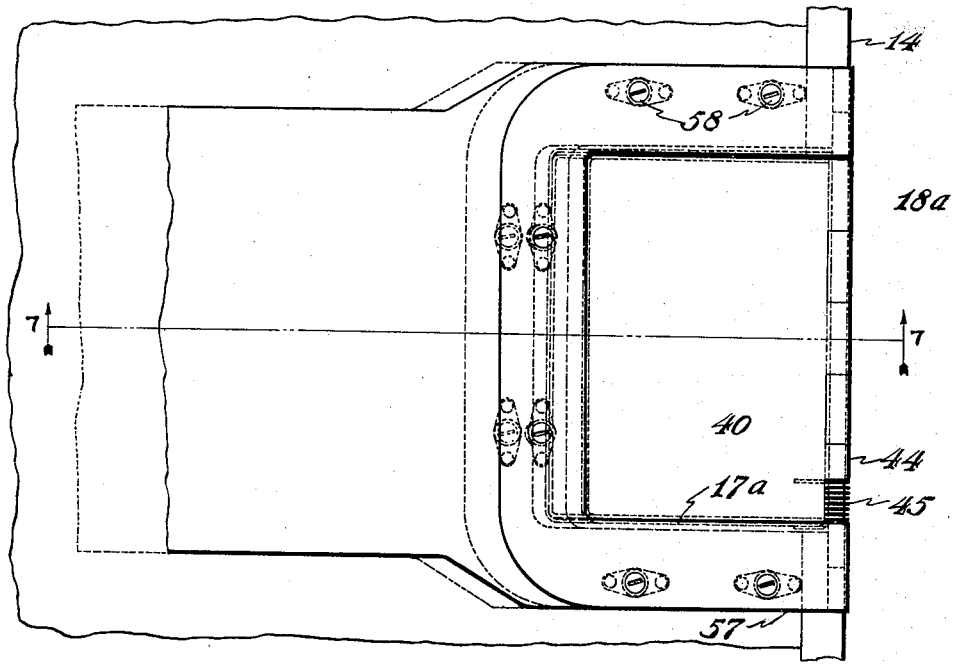
Fig. 6 is a plan of the trailing edge portion of an airfoil showing a second embodiment of a hand grip and closure.
Figure 7:
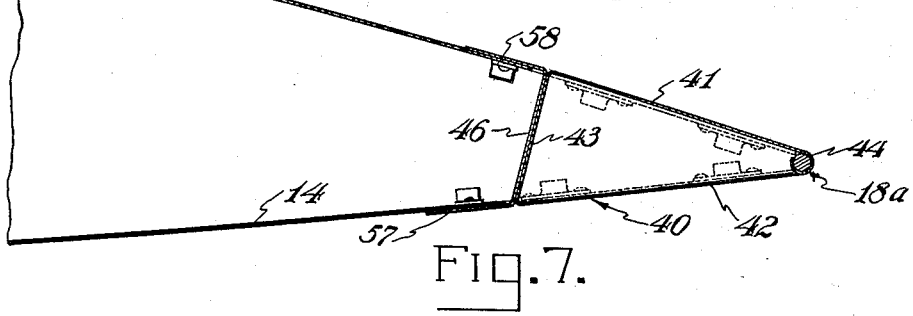
Fig. 7 is a section on the line 7—7 of Fig. 6.
Figure 8:
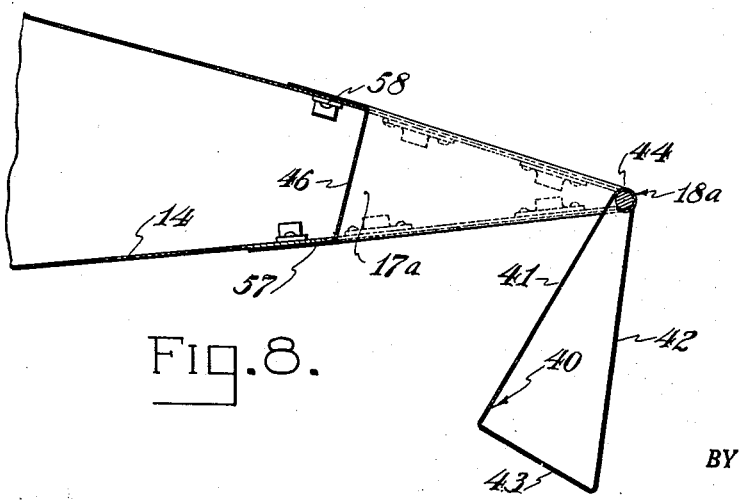
Fig. 8 is a section, similar to Fig. 7, showing the grip in a position to be grasped.

Now referring to Figs. 6, 7 and 8, wherein an alternative embodiment of the grip organization is shown, 14 again represents the center section and 17a is the cutout in the trailing edge thereof. The grip 18a comprises a rod rigidly fixed to the trailing edge portions of the center section adjacent the cutout 17a. On the grip 18a, a closure 40 is organized to swing, this closure comprising a bent sheet metal member having an upper surface 41, a lower surface 42 and a forward surface 43. The surfaces 41 and 42 converge rearwardly and are organized as a hinge 44 engaging around the grip 18a. A spring 45 is embodied in this hinge to normally urge the closure 40 to a position such as that shown in Fig. 7, wherein the surface 41 is flush with the top surface of the airfoil, and the surface 42 is flush with the lower surface of the airfoil. The airfoil has fixed thereto a plate 46, at the forward edge of the cutout 17a, against which the forward surface 43 of the closure 40 rests when said closure is in its closed position. The faces 43 and 46 are slightly slanted upwardly and rearwardly from the lower airfoil surface so that, by their engagement one with the other, the upward motion of the closure 40 is limited.

In operation, the pilot reaches for the grip 18a, his fingers engaging the upper surface 41 of the closure 40, and causing it to tilt downwardly as shown in Fig. 8, whereupon a large open space is provided forward of the grip, and wherein the closure 40 gives an additional hand hold. Upon releasing of the grip, the spring 45 urges the closure 40 upwardly to its flush position. By the slant of the surfaces 43 and 46, a minimum of binding would accrue should the pilot's fingers or his mitten be engaged therebetween.

Figure 9:
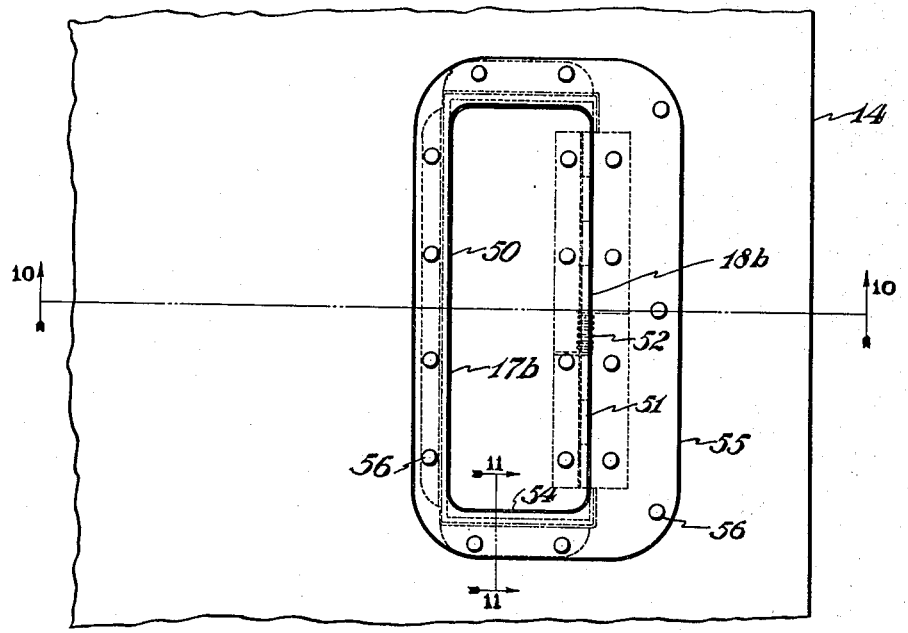
Fig. 9 is a plan of a portion of the trailing edge portion of an airfoil showing a third embodiment of a hand grip and closure.
Figure 10:
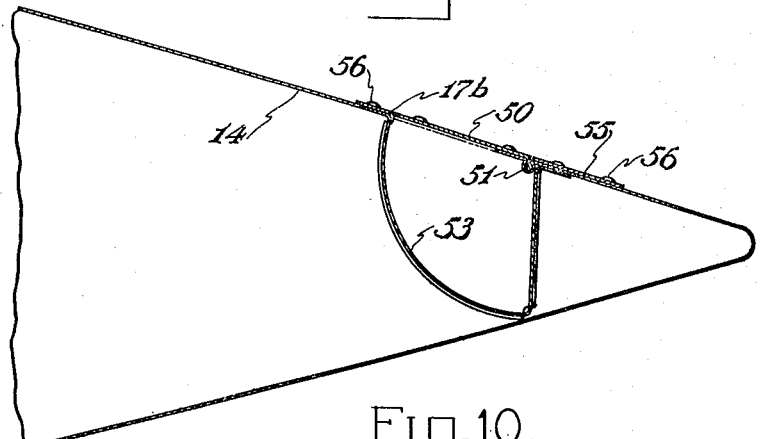
Fig. 10 is a section on the line 10—10 of Fig. 9.
Figure 11:
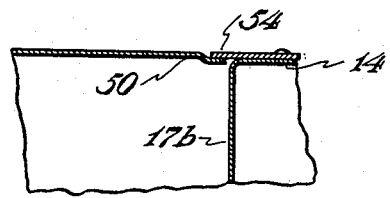
Fig. 11 is a section on the line 11—11 of Fig. 9.

Now referring to Figs. 9, 10 and 11, a third embodiment of the device is shown which is adapted to be applied to the center section 14, should such center section be of considerable thickness. The grip 18b is formed by the center section itself, at the rearward edge of the opening 17b. A closure 50 is hinged at its rearward edge to the rearward edge of the opening 17b, as at 51, the hinge being provided with a spring 52 normally urging the closure 50 upwardly. The closure 50 in this case comprises simply a flat plate which may travel from a position flush with the upper surface of the wing, shown in Fig. 10, downwardly and rearwardly to a substantially vertical position. Within the wing, an arcuate socket 53 is attached, the arc thereof being concentric with the axis of the hinge 51 and being so organized that the forward edge of the closure plate 50 is at all times closely adjacent to the socket. Thus, upon depression of the closure 50 by finger pressure, it is impossible for the pilot's fingers, or the pilot's mitten, should he be wearing one, to be caught between the closure 50 and any element of the wing. The lateral edges 54 of the opening 17b overlie the closure plate 50, as shown in Fig. 11, thereby forming a limit stop to prevent the closure plate 50 from rising above the upper surface of the airfoil.

It will be apparent that in all three embodiments of the invention, the grip assemblies and their closures may be fabricated as units for attachment to any portion of the trailing edge portion of a wing or center section, as may be desired in accordance with the design of the aircraft. The embodiment shown in Figs. 9, 10 and 11 may be built as a unit wherein the opening 17b may be cut into the wing and a plate 55, forming the edge for said opening, may have attached thereto the socket 53 and the closure plate 50. Thus, such an assembly as a unit may be attached to the wing by rivets 56 or the like. In the embodiment shown in Figs. 6, 7 and 8, the assembly also may be attached to an already fabricated wing, the plate 57 forming an edge for the opening 17a, carrying all the parts such as the grip 18a and the closure 40. This assembly may be attached adjacent the edges of the cutout 17a by means of screw fasteners 58 or the like. In the case of the embodiment shown in Figs. 1, 2 and 3, the trusses 19 along with the elements of the grip and closure may be assembled as a unit and bolted to the wing spar 20 as at 59.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an airfoil having an opening adjacent an edge thereof, a hand grip normally contiguous with the airfoil edge and organized for outward sliding with respect to said airfoil, a closure for said opening hinged to said airfoil, and a connection between said closure and said grip for extending said grip upon displacement of said closure from said opening.

2. In an airfoil having a cutout in the trailing edge thereof, a hand grip normally aligned with said edge and forming a side of said cutout, a closure for said cutout normally forming a continuation of the airfoil surface, and means responsive to movement of said closure from its normal position to extend said grip beyond said trailing edge.

3. In an airfoil having upper and lower surfaces tapering toward one another to form at their intersection a relatively thin trailing edge, said surfaces having a through cutout extending forwardly from said trailing edge, a grip member normally contiguous with said trailing edge and movable rearwardly therefrom, a box-like element within said cutout and forward of said member having upper and lower surfaces normally forming smooth continuations of said upper and lower airfoil surfaces, respectively, said element being movable with respect to said airfoil to open said cutout, and a connection between said element and said member for moving one in response to movement of the other.

4. In an airfoil having a through opening, an element movable relative to said airfoil and shaped to fill said opening and to form a smooth continuation for the surfaces thereof, a hand grip carried by and movable relative to said airfoil adjacent said opening, and a connection between said member and said element by which movement of said member, relative to said airfoil, is responsive to movement of said element to a position wherein said opening is uncovered.

5. In an aircraft surface having a hand opening, a cover hinged adjacent an edge thereof normally adapted to lie flush with the surface, and adapted to be pressed inward by a hand, a grip movably mounted adjacent an edge of said opening, and a connection between said grip and said cover whereby movement of said cover inwardly of said surface moves said grip outside the confines of said surface.

6. In an aircraft surface having an opening, a cover for said opening hinged adjacent an edge thereof for movement between positions flush with and inwardly of said surface, a grip mounted adjacent an edge of said opening movable from a position substantially within the confines of said surface to a position outside of said surface, and mechanism connecting said cover and said grip so organized and arranged as to move said grip outwardly from said surface upon movement of said cover inwardly of said surface.

7. In an aircraft surface having an opening, a cover for said opening hinged adjacent an edge thereof for movement between positions flush with and inwardly of said surface, a grip mounted adjacent an edge of said opening movable from a position substantially within the confines of said surface to a position outside of said surface, mechanism connecting said cover and said grip so organized and arranged as to move said grip outwardly from said surface upon movement of said cover inwardly of said surface, and resilient means normally holding said cover flush with said surface and said grip within the confines of said surface.

CHARLES E. HATHORN.